S. RAND.
TOOL FOR PREPARING GROUND TO RECEIVE EXPLOSIVE CHARGES.
APPLICATION FILED JAN. 15, 1912.
1,027,433.
Patented May 28, 1912.
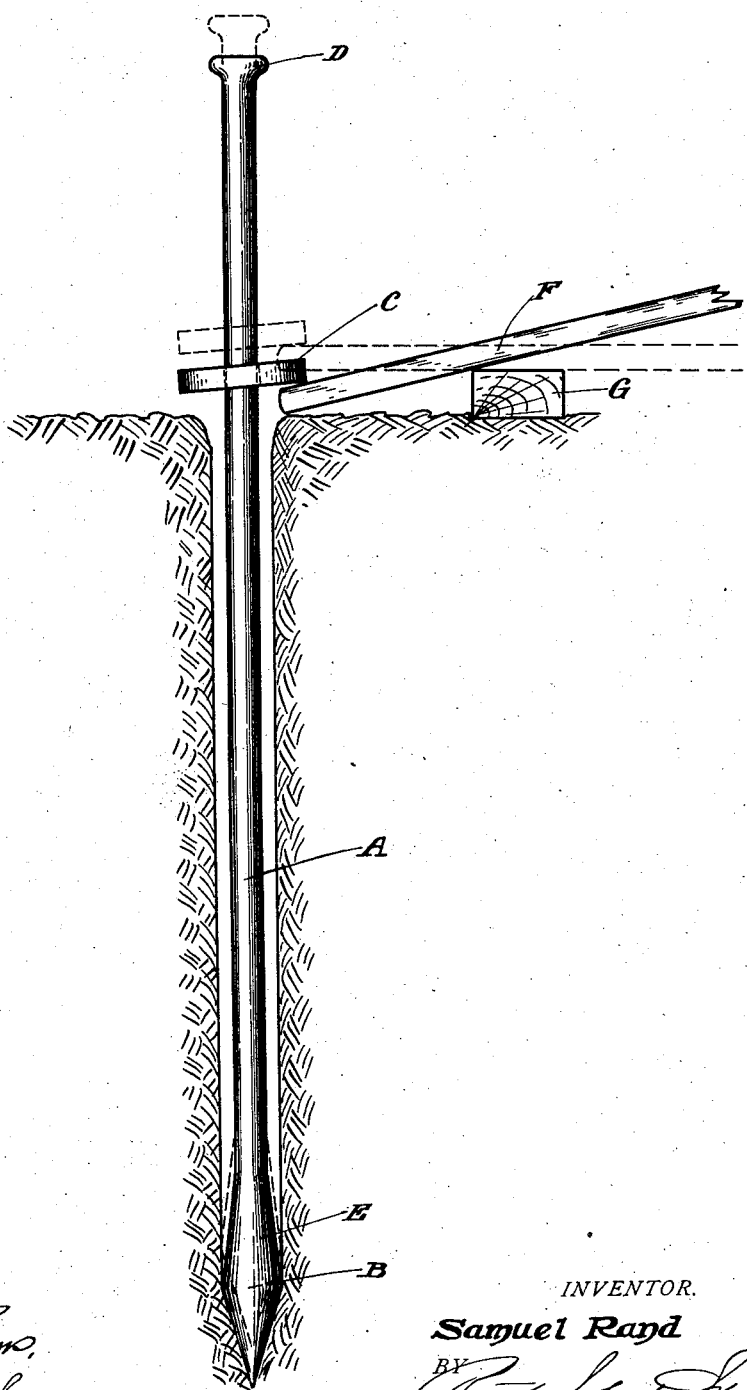
WITNESSES:
INVENTOR.
Samuel Rand
BY
ATTORNEY.

UNITED STATES PATENT OFFICE.

SAMUEL RAND, OF BIRMINGHAM, ALABAMA.

TOOL FOR PREPARING GROUND TO RECEIVE EXPLOSIVE CHARGES.

1,027,433.  Specification of Letters Patent.  Patented May 28, 1912.

Application filed January 15, 1912. Serial No. 671,387.

*To all whom it may concern:*

Be it known that I, SAMUEL RAND, a citizen of the United States, residing at Birmingham, in the county of Jefferson and State of Alabama, have invented certain new and useful Improvements in Tools for Preparing Ground to Receive Explosive Charges, of which the following is a specification.

My invention relates to a novel and effective tool for forming subsoil openings in the ground to receive charges of dynamite or like explosive which are adapted to be exploded for the purpose of breaking and opening up the subsoil and greatly increasing the productiveness of the soil for agricultural purposes.

The customary manner of utilizing the explosives for the purposes described, is to drive holes in the field about three feet in depth and approximately twenty feet apart. The practical application of this system of farming has necessitated the invention of the simplest and cheapest means for forming the holes to receive the explosive. Heretofore the most effective means has been a round pointed rod of uniform diameter which has been driven into the ground the desired depth and then drawn out with considerable exertion and delay according to the character of the soil in which the implement is driven. The difficulty in extracting the rod has been the cause of much delay and really represents the chief item of cost in preparing the field for the explosive.

I have devised the tool which is shown in side elevation in the accompanying drawing and which I have found can be withdrawn from the earth, into which it has been driven, with the minimum expenditure of energy and consequently with the least possible loss of time.

I preferably form the tool from a round bar of tool steel one inch in thickness throughout the shank portion A and which is enlarged at its lower end so that it attains an extreme width of approximately an inch and a half and is then tapered to a point. This I term the enlarged pointed head B of the tool. A steel plate C is slipped over the shank A and is provided with a case hardened central circular opening slightly larger than the shank A. I have found in practice that best results are obtained from providing the plate with an opening having a diameter about one-sixteenth of an inch larger than the diameter of the shank A. After the plate C has been slipped onto the shank A, the upper end of the latter is enlarged at D to better stand the blows of the devices used to drive the tool in the ground and also to prevent the plate C becoming disengaged from the shank. The dimensions which I have given are those which I have proven as satisfactory in practice, but they may be obviously changed and varied without departing from my invention.

In practice, the tool is driven down into the ground at the desired point, the head B forming an enlarged opening in the earth so that there is no practical engagement between the walls of the hole and the shank portion A. As the tool is driven down into the ground the plate C will normally slide down it and rest upon the ground and the shank A will pass freely through the opening in the plate as the tool is driven downwardly. When the tool has been driven to the desired depth, the upper end of the shank A can be grasped and rocked in the hole to loosen the head B, after which the tool can be readily withdrawn from the ground, as the only point in frictional engagement therewith is the head B which has an upper tapering or conical wall E which will permit it to readily work itself past any loose dirt in the hole. If the whole tool were of the same diameter throughout, except at its point, it would be in frictional engagement throughout its entire length in the ground and the difficulty in removing it would be very much greater than where all the tool except the head B stands clear of the ground. If for any reason the tool cannot be drawn out readily by hand, all that is necessary to quickly remove it, is to insert a lever F under an edge of the plate C and place a fulcrum G under the lever. By rocking the lever F about its fulcrum, the plate C will be cocked and caused to positively engage the shank A and thus give the lever a purchase on the round smooth shank A of the tool by means of which the latter may be forced out of the ground. As soon as the lever is dropped downwardly from its dotted line position, the plate C will slide down the shank automatically until it again rests on the lever in position for another lifting operation. The plate C cannot be separated from the tool and is always ready and in position when it becomes necessary to use the lever and at the same time it does not interfere with the use of the tool in soft ground where it can be readily withdrawn by hand.

Having thus described my invention, what I claim as new and desire to secure by Letters Patent, is:—

1. A tool for the purposes described, formed of a steel bar of uniform cross-sectional contour except at its ends which are both enlarged, one of said enlarged ends being tapered to a sharp point, and a plate having an opening slightly larger in diameter than said bar and which is slipped onto the bar before both of its ends are enlarged and is freely adjustable lengthwise on the bar, said enlarged ends being adapted to prevent said plate becoming disengaged from said bar.

2. A tool for the purposes described, formed of a round steel bar of uniform diameter except at its ends which are both enlarged, one of said enlarged ends being tapered to a sharp point, and a plate having a case hardened circular opening slightly larger in diameter than said bar and which is slipped onto the bar before both of its ends are enlarged and is freely adjustable lengthwise on the bar, said enlarged ends being adapted to prevent said plate becoming disengaged from said bar.

In testimony whereof I hereto affix my signature in presence of two witnesses.

SAMUEL RAND.

Witnesses:
G. L. McCULLOUGH,
LUTIE CHISHOLM.

---

Copies of this patent may be obtained for five cents each, by addressing the "Commissioner of Patents, Washington, D. C."